(12) United States Patent
Nelson et al.

(10) Patent No.: US 6,953,223 B2
(45) Date of Patent: Oct. 11, 2005

(54) ENERGY ABSORBING SEAT AND SEAT SYSTEM FOR A MOBILE VEHICLE

(75) Inventors: Erik K. Nelson, Woodburn, IN (US); Thomas R. Graham, Fort Wayne, IN (US); Patrick J. Mattes, Yoder, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/053,103

(22) Filed: Feb. 8, 2005

(65) Prior Publication Data

US 2005/0189800 A1   Sep. 1, 2005

Related U.S. Application Data

(60) Provisional application No. 60/548,030, filed on Feb. 26, 2004.

(51) Int. Cl.$^7$ ............................................. B60R 21/00
(52) U.S. Cl. .............................. 297/216.13; 297/216.1; 297/216.14; 297/488; 280/751
(58) Field of Search .................... 297/216.1, 216.13, 297/216.14, 487, 488, 483; 280/751

(56) References Cited

U.S. PATENT DOCUMENTS

| | | | |
|---|---|---|---|
| 4,252,341 A | * | 2/1981 | Barecki et al. .............. 297/488 |
| 4,335,918 A | * | 6/1982 | Cunningham .......... 297/216.14 |
| 4,784,352 A | | 11/1988 | Smith et al. |
| 4,930,808 A | * | 6/1990 | Mikoll et al. ................ 280/751 |
| 5,882,072 A | * | 3/1999 | Morlock ................. 297/216.13 |
| 6,033,017 A | * | 3/2000 | Elqadah et al. .......... 297/216.1 |
| 6,123,388 A | | 9/2000 | Vits et al. |
| 6,186,545 B1 | * | 2/2001 | Corbett ....................... 280/751 |
| 6,485,098 B1 | | 11/2002 | Vits et al. |

FOREIGN PATENT DOCUMENTS

GB          2083347 A   *   3/1982          ............ B60N 1/02

* cited by examiner

*Primary Examiner*—Anthony D. Barfield
(74) *Attorney, Agent, or Firm*—Jeffrey P. Calfa; Dennis Kelly Sullivan; Susan L. Lukasik

(57) ABSTRACT

The invention involves creating a thinner structured seat capable of complying with the federal requirements. The steel back pan is rigidly mounted on three edges to the back frame seat structure. The bottom of the back pan is unformed and allowed to flex in the fore-aft direction. The back pan is then covered with foam that may be one third as thick at the bottom as to thickness at the top of the back pan. The three to one ration of the lower to upper portion for the foam is important in achieving seat thinness. When seat spacing is measured at the h-point or cushion level, the knee protection zone is thinner than conventional seats and allows for a greater number of seats to be placed into a school bus. Utilizing a flexible steel back pan combined with foam in the proper ratios to absorb energy in the knee protection zone through the upper portion achieves the invention.

15 Claims, 3 Drawing Sheets

ENERGY ABSORBING SEAT AND SEAT SYSTEM FOR A MOBILE VEHICLE

This patent issued from a non-provisional patent application claiming the priority of provisional patent application Ser. No. 60/548,030, filed Feb. 26, 2004.

BACKGROUND

Automotive vehicles have had three point seat belt systems that combine a lap belt and an upper torso belt for some time now. The tongue may be swung across the person and engaged with a buckle affixed to the seat thereby positioning one portion of the belt across the lap and another portion of the belt across the upper torso.

Designers of school buses face a conundrum in including three point seat belts in buses in that the requirements involved with installing a three-point seat belt may act in conflict with the requirements for passive restraints. The U.S. federal government requirement for passive restraints requires that the rear side of the seat provide an impact barrier in which the seat back bends or deforms when subjected to the force of occupants impacting the rear side in a deceleration event. The National Highway Traffic Safety Administration, DOT (NHTSA), sets the federal requirements for these passive restraints. These are codified as 49 C.F.R. Section 571.222 (FMVSS 222).

The code specifies a passive restraint system, and does not require any sort of active restraints such as a two-point passenger restraining lap belt or a three-point passenger restraining lap belt and torso harness combination. The passive restraint requirement effectively provides a compartment in which an unbuckled passenger is constrained during a rapid deceleration of the bus. Although two point belt systems are offered on buses, designers need to consider three-point seat belts where there is a request for them through local, state, or transportation/parental action groups. Three point seat belt designs are also regulated under NHTSA code. These requirements relate to belts that are mounted in such a fashion that they inhibit a belted passengers forward movement. This three-point belt-mounting requirement is codified in 49 C.F.R. Sections 571.209 and 571.210 (FMVSS 209 and FMVSS 210).

The design conundrum results from the fact that tests have shown that in a rapid deceleration where the passenger in the front seat is buckled and the passenger in the rear seat is not, the initial action is that the buckled passenger moves forward applying tension on the buckled seat belt and the component the belt is affixed to. This results in a pulling of the fixture component in a forward direction thereby reducing the strength on the rear impact face for the unbuckled passenger behind the seat in question. Following the tension applied on the three-point belt, the rear passenger would be expected to contact the seat back. The reduction in seat back strength due to the pull on the three-point seat belt for FMVSS 210 requirement may reduce the ability of the seat back to meet the FMVSS 222 requirements. Recent school bus seat designs have been developed that involve a movable inner seat for the mounting of the three point seat belts and an immovable seat back portion for the absorption of the rear unbuckled passenger loads. The movable inner seat was inserted into a recess within the immovable seat back. The immovable seat back would be designed to deform in order to comply with FMVSS 222. One of these designs was disclosed in U.S. Pat. Nos. 6,123,388, and 6,485,098. The concept of a seat inserted within a seat was not new to this bus seat. That concept was disclosed in U.S. Pat. No. 4,784,352. One problem with this prior art was the complexity of the mechanism to stop the movable inner seat.

SUMMARY

The invention involves creating a thinner structured seat capable of complying with the federal requirements. The steel back pan is rigidly mounted on three edges to the back frame seat structure. The bottom of the back pan is unformed and allowed to flex in the fore-aft direction. The back pan is then covered with foam that may be 0.5" thick at the bottom that increases to 1.5" thick at the top of the back pan. The three to one ration of the lower to upper portion for the foam is important in achieving seat thinness. When seat spacing is measured at the h-point or cushion level, the knee protection zone is thinner than conventional seats and allows for a greater number of seats to be placed into a school bus. Utilizing a flexible steel back pan combined with foam in the proper ratios to absorb energy in the knee protection zone through the upper portion achieves the invention.

DRAWINGS

Other objects and advantages of the invention will become more apparent upon perusal of the detailed description thereof and upon inspection of the drawings, in which.

DESCRIPTION OF INVENTION

Figure 1:
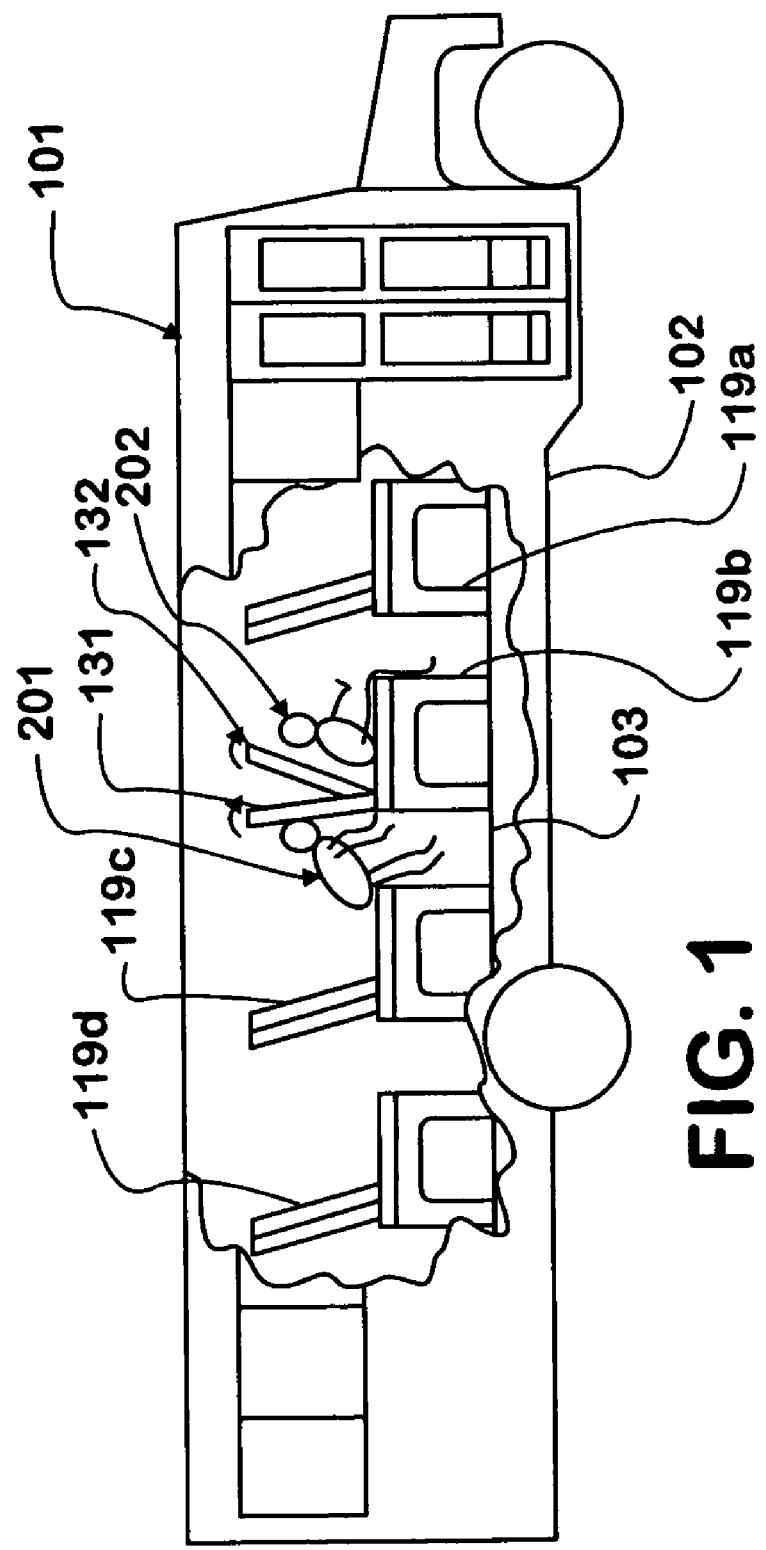
FIG. 1 is a cutaway view of a vehicle using an embodiment of the seat sub-system made in accordance with this invention.

A motor vehicle 101 includes a passenger carrying body 102. The vehicle 101 may be a school bus. The body 102 includes a mounting floor 103 for the mounting and placement of passenger seating. The vehicle 101 shown in FIG. 1 has a series of passenger seats 119a, 119b, 119c, and 119d installed on the mounting floor 103 of the vehicle body 102 arranged from the front of the vehicle to the back. A rearward passenger 201 may sit in seat 119c and a frontward passenger 202 may sit in seat 119b in front of rearward passenger 201. One passenger seat with integrated passenger restraints 119 made in accordance with the invention has a movable front frame 132 that a seat occupant rests his or her back against normally. The front frame 132 is mounted to a seat frame 120. The front frame 132 is the mounting point for the upper portion of a three-point seat belt 142. The seat frame 120 is mountable to the bus body 102 mounting surface 103. The seat frame 120 contains a rear frame 131 to protect a passenger of rearward seat from moving out of his safety zone in a forward direction in the event of a rapid deceleration. This is shown in FIG. 1 that shows a rapid deceleration condition. The passenger 202 in seat 119b is buckled to the seat. The passenger 201 in the rearward seat 119c is not buckled. The passenger 201 is contained within the area between the rear frame of seat 119b and the front of seat 119c.

The vehicle may have a two-piece seat capable of complying with the federal requirements with reduced complexity. The front frame 132 is movable relative to the seat frame 120. In the embodiment shown in FIG. 3, the front frame 132 is rotatable about the seat frame 120 about a shaft or pivoting mechanism 133 that is at least partially engaged to the seat frame 120. The movable frame 132 is not shown in FIG. 2. The movable front frame 132 normally roughly parallel and in contact with the immovable rear frame 131. The movable front frame 132 may move forward due to the pull of a passenger held with seat belt 142. The force of the passenger on the belt 142 may pull the movable seat back 132 forward. The movement of the movable or front seat back 132 away from the rear frame 131 leaves the rear frame 131 intact to absorb the force from an unbelted passenger in the seat behind seat 119b.

The rear frame 131 is engaged to the seat frame 120 through two rear frame mounting brackets 134. The rear frame 131 is comprised of three main components: a rear or back frame seat structure 150; an energy absorbing back pan 160; and variable thickness foam 170. The rear frame seat structure 150 may be one integral piece of tubing bent or formed. The rear frame seat structure 150 is comprised of three parts: two vertical spars 151 with one upper horizontal spar 152 running between the upper portions of the vertical spars 151. The rear frame 131 may be attached to the rear mounting brackets 134 of the seat frame 120 where the lower distal ends of the vertical spars 151 are inserted into engagement with the rear mounting brackets 134. The back pan 150 may be steel, however, in any case it will be of a flexible material allowing for energy absorption. The back pan 150 is comprised of back pan side edges 161 and a back pan top edge 162 that are engaged to the rear frame structure 150, vertical spars 151, and horizontal spar 152, respectively. There is a back pan lower edge 164 that is free moving. The back pan side edges 161, top edge 162, and lower edge 164 are integrally engaged to an energy absorbing flex sheet 163. The fact that the back pan 160 is only rigidly mounted on 3 edges allows for the lower edge 164 of the back pan 160 to flex in the fore-aft direction through flex sheet 163 movement. The lower edge 164 of the back pan 160 may be unformed or not folded over or hemmed to allow for enhanced energy absorbing flexibility in the event of impact upon the rearward side of the rear frame 131 by an unbuckled passenger sitting in a seat behind seat 119. See FIGS. 2 and 3.

The back pan 160 may be covered by foam 170. The foam 170 includes a rear upper foam zone 171 and a rear lower or knee impact zone 172. The knee impact zone 172 has a foam thickness B while the upper foam zone has a foam thickness A. Foam thickness A is greater than foam thickness B due to the lower back pan 160 flexibility. In one embodiment, the ratio of foam thickness A to B is three to one (3:1). The foam thickness B of the knee impact zone 172 may be as thin as one half inch (0.5").

The three to one ratio of the lower to upper portion for the foam is important in achieving seat thinness. When seat spacing is measured at the h-point or cushion level, the knee protection zone is thinner than conventional seats and allows for a greater number of seats to be placed into a school bus. Utilizing a flexible steel back pan combined with foam in the proper ratios to absorb energy in the knee protection zone through the upper portion achieves the invention.

Figure 2:
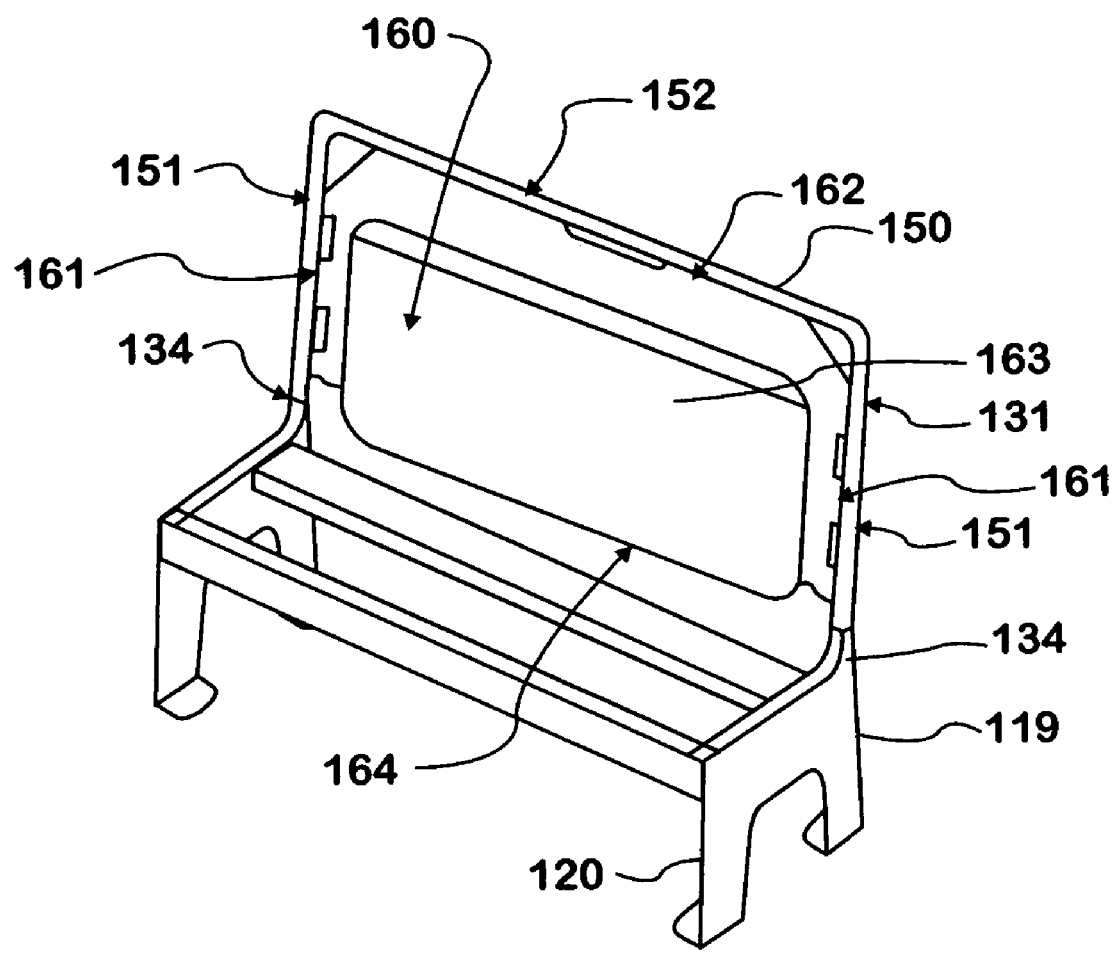
FIG. 2 is a perspective view of the seat sub-system without a movable front frame for use with the vehicle shown in FIG. 1.
Figure 3:
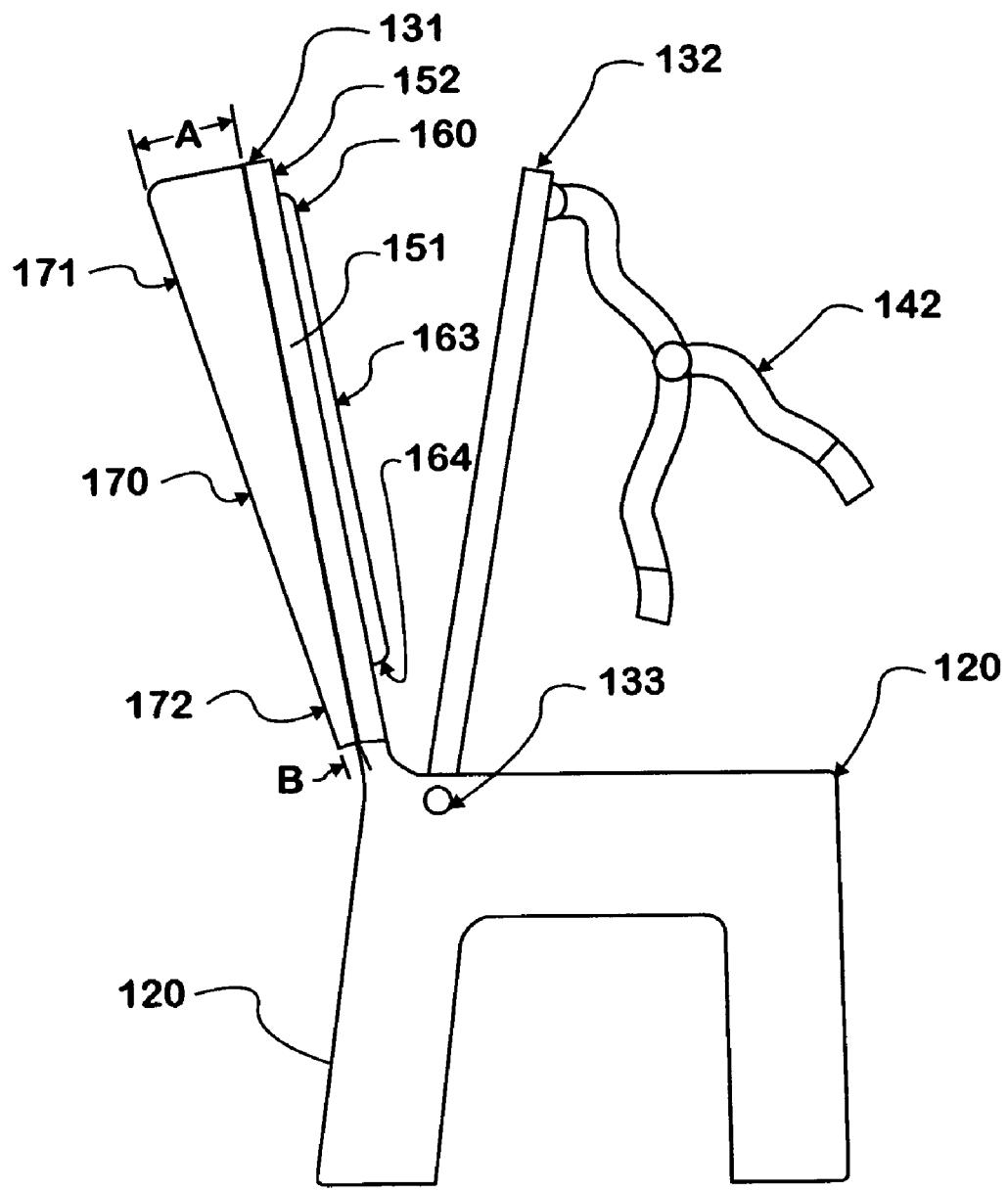
FIG. 3 is a side view of the seat sub-system of FIG. 2.

Although the seats 119 shown in the vehicle 101 and individually in FIG. 3 have both a movable front frame 132 and an immovable rear frame 131, a seat may have just the rear frame 131 described above. Such a seat is shown in FIG. 2, without foam 170.

As described above, the energy absorbing seat system of this invention and vehicle made with the seat system provide a number of advantages, some of which have been described above and others of which are inherent in the invention. Also modifications may be proposed to the energy absorbing seat system and vehicle made with the seat system of this invention without departing from the teachings herein.

We claim:

1. A passenger seat for a multi-passenger motor vehicle, the vehicle having a body with a seat mounting surface, comprising:
    a seat frame, mountable to the seat mounting surface;
    an immovable rear seat frame engaged to said seat frame, said rear seat frame providing an obstruction to protect a passenger of a vehicle rearward seat from moving out of his safety zone in a forward direction in the event of a vehicle rapid deceleration;
    a movable front frame, pivotably engaged to said seat frame forward of said immovable rear seat frame, said movable front frame providing a back resting surface for a passenger;
    a three point seat belt, an upper portion of said seat belt being engaged to an upper portion of said movable front frame, said seat belt causing a pivoting force upon said movable front frame during an activation event;
    said immovable rear frame being comprised of a rear frame seat structure, and an energy absorbing back pan with variable thickness foam;
    said rear frame seat structure being comprised of two vertical spars with one upper horizontal spar running between the upper portions of the vertical spars;
    said energy absorbing back pan having four sides, with three of said sides engaged to said two vertical spars and said upper horizontal spar of said rear frame seat structure, with a fourth lower horizontal side not attached to said rear frame seat structure; and
    said back pan having foam on a rearward side, said foam including an upper foam zone and a lower knee impact zone, said knee impact zone having a foam thickness less than said upper foam zone foam thickness.

2. The passenger seat for a multi-passenger motor vehicle of claim 1, wherein:
    said knee impact zone thickness being less than or equal to one third of said upper zone thickness.

3. The passenger seat for a multi-passenger motor vehicle of claim 1, wherein:
    said rear frame being engaged to said seat frame through two rear frame mounting brackets;
    said rear frame seat structure being one integral piece of tubing comprised of three parts: two vertical spars with one upper horizontal spar running between the upper portions of the vertical spars; and
    said rear frame being attached to said rear mounting brackets of said seat frame where lower distal ends of said vertical spars being inserted into engagement with said rear mounting brackets.

4. The passenger seat for a multi-passenger motor vehicle of claim 3, wherein:
    said back pan being comprised of back pan side edges and a back pan top edge being engaged to said rear frame structure, vertical spars, and horizontal spar, respectively;
    a back pan lower edge being free moving;
    said back pan side edges, said top edge, and lower edge being integrally engaged to an energy absorbing flex sheet; and
    said lower edge of the back pan being unformed.

5. The passenger seat for a multi-passenger motor vehicle of claim 2, wherein:
    said rear frame being engaged to said seat frame through two rear frame mounting brackets;
    said rear frame seat structure being one integral piece of tubing comprised of three parts: two vertical spars with one upper horizontal spar running between the upper portions of the vertical spars; and said rear frame being attached to said rear mounting brackets of said seat frame where lower distal ends of said vertical spars being inserted into engagement with said rear mounting brackets.

6. The passenger seat for a multi-passenger motor vehicle of claim 5, wherein:
said back pan being comprised of back pan side edges and a back pan top edge being engaged to said rear frame structure, vertical spars, and horizontal spar, respectively;
a back pan lower edge being free moving;
said back pan side edges, said top edge, and lower edge being integrally engaged to an energy absorbing flex sheet; and
said lower edge of the back pan being unformed.

7. A passenger seat for a multi-passenger motor vehicle, the vehicle having a body with a seat mounting surface, comprising:
a seat frame, mountable to the seat mounting surface;
an immovable rear seat frame engaged to said seat frame, said rear seat frame providing an obstruction to protect a passenger of a vehicle rearward seat from moving out his safety zone in a forward direction in the event of a vehicle rapid deceleration;
said immovable rear frame being comprised of a rear frame seat structure, and an energy absorbing back pan with variable thickness foam;
said rear frame seat structure being comprised of two vertical spars with one upper horizontal spar running between the upper portions of the vertical spars;
said energy absorbing back pan having four sides, with three of said sides engaged to said two vertical spars and said upper horizontal spar of said rear frame seat structure, with a fourth lower horizontal side not attached to said rear frame seat structure;
said back pan having foam on a rearward side, said foam including an upper foam zone and a lower knee impact zone, said knee impact zone having a foam thickness less than said upper foam zone foam thickness; and
said knee impact zone thickness being less than or equal to one third of said upper zone thickness.

8. The passenger seat for a multi-passenger motor vehicle of claim 7, wherein:
said rear frame being engaged to said seat frame through two rear frame mounting brackets;
said rear frame seat structure being one integral piece of tubing comprised of three parts: two vertical spars with one upper horizontal spar running between the upper portions of the vertical spars; and
said rear frame being attached to said rear mounting brackets of said seat frame where lower distal ends of said vertical spars being inserted into engagement with said rear mounting brackets.

9. The passenger seat for a multi-passenger motor vehicle of claim 8, wherein:
said back pan being comprised of back pan side edges and a back pan top edge being engaged to said rear frame structure, vertical spars, and horizontal spar, respectively;
a back pan lower edge being free moving;
said back pan side edges, said top edge, and lower edge being integrally engaged to an energy absorbing flex sheet; and
said lower edge of the back pan being unformed.

10. A multi-passenger motor vehicle, comprising:
a body with a seat mounting surface;
at least two passenger seats, one said passenger seat having seat frame, mountable to said seat mounting surface;
an immovable rear seat frame engaged to said seat frame, said rear seat frame providing an obstruction to protect a passenger of a vehicle rearward seat from moving out his safety zone in a forward direction in the event of a vehicle rapid deceleration;
a movable front frame, pivotably engaged to said seat frame forward of said immovable rear seat frame, said movable front frame providing a back resting surface for a passenger;
a three point seat belt, an upper portion of said seat belt being engaged to an upper portion of said movable front frame, said seat belt causing a pivoting force upon said movable front frame during a rapid deceleration activation event;
said immovable rear frame being comprised of a rear frame seat structure, and an energy absorbing back pan with variable thickness foam;
said rear frame seat structure being comprised of two vertical spars with one upper horizontal spar running between the upper portions of the vertical spars;
said energy absorbing back pan having four sides, with three of said sides engaged to said two vertical spars and said upper horizontal spar of said rear frame seat structure, with a fourth lower horizontal side not attached to said rear frame seat structure; and
said back pan having foam on a rearward side, said foam including an upper foam zone and a lower knee impact zone, said knee impact zone having a foam thickness less than said upper foam zone foam thickness.

11. The multi-passenger motor vehicle of claim 10, wherein:
said knee impact zone thickness being less than or equal to one third of said upper zone thickness.

12. The multi-passenger motor vehicle of claim 10, wherein:
said rear frame being engaged to said seat frame through two rear frame mounting brackets;
said rear frame seat structure being one integral piece of tubing comprised of three parts: two vertical spars with one upper horizontal spar running between the upper portions of the vertical spars; and
said rear frame being attached to said rear mounting brackets of said seat frame where lower distal ends of said vertical spars being inserted into engagement with said rear mounting brackets.

13. The multi-passenger motor vehicle of claim 12, wherein:
said back pan being comprised of back pan side edges and a back pan top edge being engaged to said rear frame structure, vertical spars, and horizontal spar, respectively;
a back pan lower edge being free moving;
said back pan side edges, said top edge, and lower edge being integrally engaged to an energy absorbing flex sheet; and
said lower edge of the back pan being unformed.

14. The multi-passenger motor vehicle of claim 11, wherein:
said rear frame being engaged to said seat frame through two rear frame mounting brackets;
said rear frame seat structure being one integral piece of tubing comprised of three parts: two vertical spars with one upper horizontal spar running between the upper portions of the vertical spars; and
said rear frame being attached to said rear mounting brackets of said seat frame where lower distal ends of said vertical spars being inserted into engagement with said rear mounting brackets.

15. The multi-passenger motor vehicle of claim 14, wherein:

said back pan being comprised of back pan side edges and a back pan top edge being engaged to said rear frame structure, vertical spars, and horizontal spar, respectively;

a back pan lower edge being free moving;

said back pan side edges, said top edge, and lower edge being integrally engaged to an energy absorbing flex sheet; and said lower edge of the back pan being unformed.

* * * * *